(12) United States Patent
Kronebusch

(10) Patent No.: US 10,350,442 B2
(45) Date of Patent: Jul. 16, 2019

(54) NOZZLE CAP FOR FIRE EXTINGUISHER

(71) Applicant: Kronebusch Industries, LLC, Rochester, MN (US)

(72) Inventor: Allen R. Kronebusch, Oronoco, MN (US)

(73) Assignee: Kronebusch Industries, LLC, Rochester, MN (US)

(*) Notice: Subject to any disclaimer, the term of this patent is extended or adjusted under 35 U.S.C. 154(b) by 0 days.

(21) Appl. No.: 16/127,909

(22) Filed: Sep. 11, 2018

(65) Prior Publication Data

US 2019/0009118 A1  Jan. 10, 2019

Related U.S. Application Data

(62) Division of application No. 14/986,271, filed on Dec. 31, 2015, now Pat. No. 10,105,561.

(60) Provisional application No. 62/187,241, filed on Jun. 30, 2015.

(51) Int. Cl.
*A62C 13/64* (2006.01)
*A62C 13/76* (2006.01)
*G01K 1/14* (2006.01)
*A62C 13/00* (2006.01)
*G01L 19/08* (2006.01)

(52) U.S. Cl.
CPC ............. *A62C 13/64* (2013.01); *A62C 13/76* (2013.01); *G01K 1/14* (2013.01); *A62C 13/003* (2013.01); *G01L 19/08* (2013.01)

(58) Field of Classification Search
CPC ....... A62C 13/64; A62C 13/76; A62C 13/003; G01K 1/14; G01L 19/08
USPC ................. 169/74, 75, 89; 239/288-288.5; 222/402.11, 182, 183; 251/89, 90
See application file for complete search history.

(56) References Cited

U.S. PATENT DOCUMENTS

| | | | |
|---|---|---|---|
| 3,107,823 A | 10/1963 | Focht | |
| 3,133,680 A | 5/1964 | Sliwinski | |
| D217,828 S | 6/1970 | Hilliard | |
| D227,043 S | 5/1973 | Vandenberg | |
| 3,820,695 A | 6/1974 | Pecjak | |
| D259,712 S | 6/1981 | Heydenreich | |
| 4,586,570 A | 5/1986 | Swift | |
| 4,705,064 A | 11/1987 | Self | |
| 5,547,091 A * | 8/1996 | Neveras | B65D 35/14 222/212 |
| 5,775,432 A | 7/1998 | Burns | |
| D399,028 S | 9/1998 | Fenne | |
| 6,364,166 B1 * | 4/2002 | Ritsche | B05B 11/0027 222/182 |
| 6,752,296 B1 | 6/2004 | Sweeton | |
| D500,704 S | 1/2005 | Kruse | |
| 7,216,721 B2 | 5/2007 | Jacobson et al. | |
| D625,513 S | 10/2010 | Carnes | |
| 7,896,205 B1 | 3/2011 | Gonzalez | |
| 8,397,714 B2 * | 3/2013 | Pearson | A61M 15/009 222/153.13 |
| D725,262 S | 3/2015 | Chowdhury | |

(Continued)

*Primary Examiner* — Steven J Ganey
(74) *Attorney, Agent, or Firm* — Merhcant & Gould P.C.

(57) ABSTRACT

A dispenser cap for a fire extinguisher includes a main body portion that has a generally hemispherical shape. The dispenser cap also includes a securing portion adjacent to the main body portion. The securing portion is configured to be removably attached to a dispenser of the fire extinguisher.

18 Claims, 9 Drawing Sheets

(56) References Cited

U.S. PATENT DOCUMENTS

| | | | |
|---|---|---|---|
| D739,240 S | 9/2015 | Satterfield | |
| 9,352,348 B2 * | 5/2016 | Greiner-Perth | B05B 11/0032 |
| 10,105,561 B2 * | 10/2018 | Kronebusch | A62C 13/64 |
| 2012/0312840 A1 * | 12/2012 | Hasegawa | A61F 9/0008 |
| | | | 222/420 |

* cited by examiner

NOZZLE CAP FOR FIRE EXTINGUISHER

CROSS-REFERENCE TO RELATED APPLICATION

This is a Divisional Application of U.S. application Ser. No. 14/986,271, filed on Dec. 31, 2015, and titled NOZZLE CAP FOR FIRE EXTINGUISHER, which claims priority to U.S. Application No. 62/187,241, filed on Jun. 30, 2015, and titled NOZZLE CAP FOR FIRE EXTINGUISHER, the disclosures of which are hereby incorporated by reference in their entireties. To the extent appropriate a claim of priority is made to each of the above-disclosed applications.

BACKGROUND

Fire extinguishers are sometimes used to extinguish or control small fires in emergency situations. A fire extinguisher typically includes a cylindrical pressure vessel containing an agent in a pressurized state. The agent can be discharged from the vessel and into the fire to extinguish the fire.

Fire extinguishers are often handheld devices that include a manual discharge trigger. Operation of the fire extinguisher involves removing a safety pin and squeezing a handle while aiming a dispenser of the fire extinguisher toward the fire. The agent is then discharged through the dispenser and into the fire.

Fire extinguishers can be stored in a variety of different environments. Some environments are harsher than others and can expose the fire extinguisher to a variety of abuse and debris. Such abuse and debris can lead to the failure of the fire extinguisher during the event of a fire, which can have catastrophic consequences.

SUMMARY

In general terms, this disclosure is directed to a fire extinguisher. In one possible configuration and by non-limiting example, this disclosure relates to a removable cap for a fire extinguisher dispenser. Various aspects are described in this disclosure, which include, but are not limited to, the following aspects.

One aspect is a dispenser cap for a fire extinguisher that includes a main body portion that has a generally hemispherical shape. The dispenser cap also includes a securing portion adjacent to the main body portion. The securing portion is configured to be removably attached to a dispenser of the fire extinguisher.

Another aspect is a fire extinguisher that includes a container that has a chamber for holding a fire-extinguishing agent and a dispenser attached to the container. The dispenser has a fire-extinguishing agent dispensing port. The fire extinguisher also includes a cap disposed over at least the fire-extinguishing agent dispensing port of the dispenser. The cap is automatically releasable from the dispensing port of the dispenser. Another aspect is a fire extinguisher that includes a container that includes a chamber for holding a fire-extinguishing agent. The container also includes a domed top portion that includes a valve port and a recessed bottom portion. The recessed bottom portion has an edge for standing the container generally upright. The fire extinguisher also includes a valve attached to the valve port of the container and a dispenser attached to the container for operating the valve. The dispenser includes a handle, a pivotable trigger, and a fire-extinguishing agent dispensing port. Further, the fire extinguisher includes a safety pin that is removably disposed within the dispenser to prevent the pivoting of the pivotable trigger. In some examples, an elastomer cap is disposed over at least the fire-extinguishing agent dispensing port of the dispenser. The elastomer cap is in contact with at least a portion of the safety pin and automatically releasable from the fire-extinguishing agent dispensing port upon removal of the safety pin from the dispenser. The fire extinguisher also includes a gauge mounted within the recessed bottom portion of the container. The gauge is configured to display at least one characteristic of the chamber of the container and is mounted above the edge of the recessed bottom portion.

DETAILED DESCRIPTION

Figure 1:
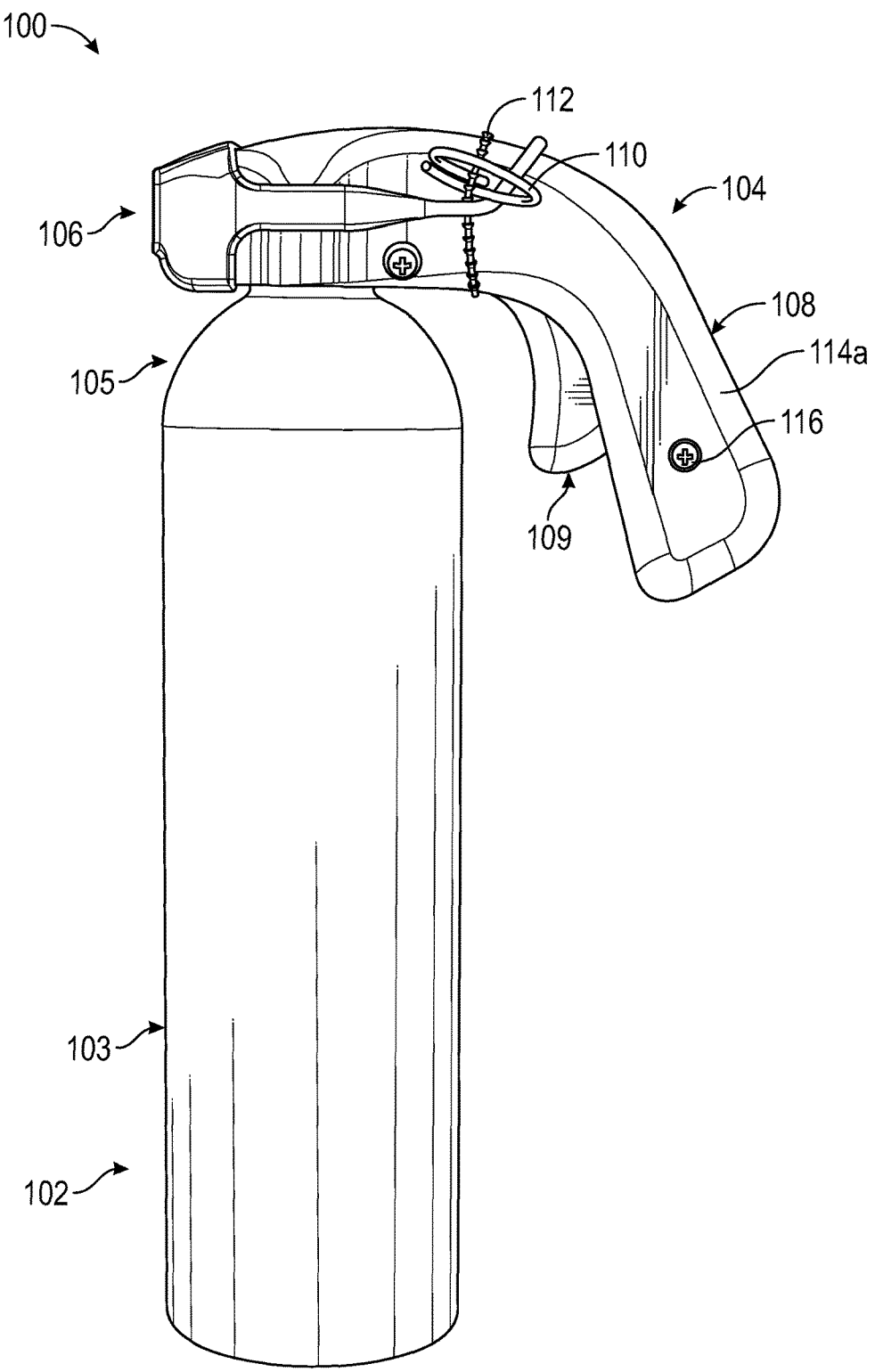
FIG. 1 illustrates a perspective view of a fire extinguisher, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a perspective view of an example of a fire extinguisher 100. In the depicted embodiment, the fire extinguisher 100 is configured to sit upright on a flat surface. In this example, the fire extinguisher 100 includes a container 102, a dispenser 104, and a cap 106. In some embodiments, the fire extinguisher 100 is configured to be operated by a single hand of a user to extinguish a fire.

In the depicted embodiment, the fire extinguisher 100 is configured to be a ruggedized fire extinguisher 100 that is configured to be used in a variety of environments. In some embodiments, the fire extinguisher 100 can be stored in a variety of different orientations, easing storage and allowing the fire extinguisher 100 to be used in a variety of vehicles, cabinets, or other storage areas where storing traditional fire extinguishers is difficult. In some embodiments, the fire extinguisher 100 has a ruggedized construction so as to withstand a drop, an accidental impact, and other abuse. Additionally, the fire extinguisher 100 is constructed of materials that reduce the risk of the fire extinguisher 100 exploding and sending pieces into the air in the rare event of a catastrophic failure. In some embodiments, the fire extinguisher 100 has a burst strength of between about 800 psi and 900 psi. In some embodiments, the fire extinguisher 100 has a burst strength of about 850 psi.

As shown, the container 102 has a generally cylindrical main body portion 103 and a domed upper portion 105. In other embodiments, the container 102 can be of other shapes. The container 102 is a container 102 configured to store the fire-extinguishing agent within an internal chamber. In some embodiments the container 102 stores the fire-extinguishing agent in a pressurized state. A variety of different extinguishing agents can be used, such as a powder-based agent, water, wet chemical, and clean agents. For example, different agents are used for different classes of fires, such as fires on ordinary combustibles including wood, cloth, paper, and plastics; fires on flammable liquids including gasoline, oil, grease, and tar; or fires on energized electrical equipment including wiring, fuse boxes, circuit breakers, and machinery. These and other agents can be used in various possible embodiments.

In some embodiments the container 102 is an aerosol spray can. The aerosol spray can includes a top that forms a permanent seal that prevents the agent from leaking from the container 102. The construction of the container 102 prevents leaking and allows the fire extinguisher 100 to last for an extended period of time without requiring frequent servicing, unlike traditional fire extinguishers that typically require annual servicing and have limited shelf lives.

In other possible embodiments, the container 102 contains an agent usable for a purpose other than for extinguishing a fire. As one example, the agent is a repellant agent that can be used to repel humans or animals. An example of a repellant agent is a lychrymatory agent, such as pepper spray. A repellant agent can be used for policing, riot control, crowd control, and personal self-defense, for example.

The dispenser 104 is configured to manually dispense the fire-extinguishing agent from the container 102. The dispenser 104 includes a housing 108, a trigger 109, and a safety pin 110. In some embodiments, the dispenser 104 also includes a tamper seal 112. In some embodiments, the dispenser 104 is at least partially ornamental in nature and features nonfunctional elements. For example, the housing 108 includes a curved profile.

Figure 2:
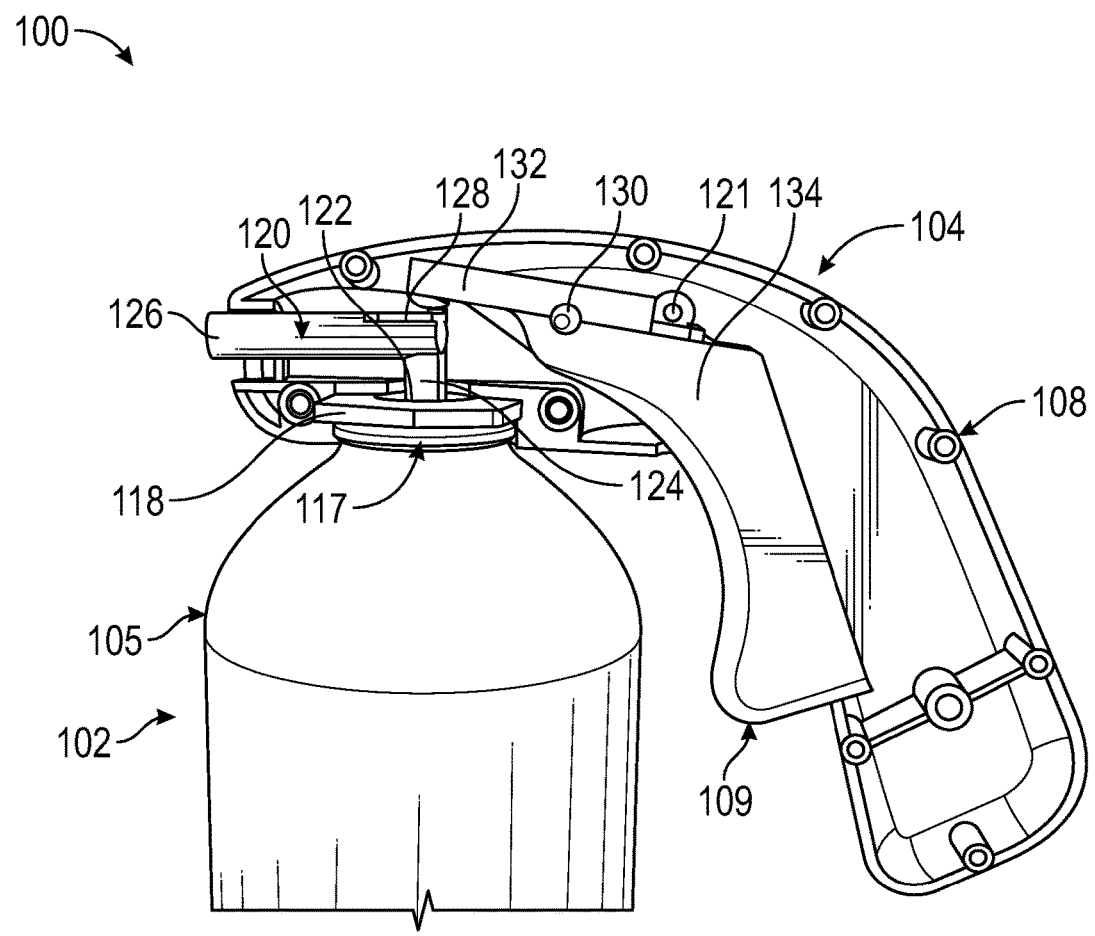
FIG. 2 illustrates a side view of fire extinguisher of FIG. 1 partially dissembled.

The housing 108 is configured to house a plurality of dispensing components discussed in more detail with respect to FIG. 2. In the depicted embodiment, the housing 108 includes two halves 114a, 114b. The halves 114a, 114b are connected to one another by way of a plurality of fasteners 116. The housing 108 is configured to surround the trigger 109.

The trigger 109 is configured to be pivotable so to selectively activate the dispensing of the fire extinguishing agent from the container 102. Specifically, the trigger 109 is configured to be pulled to activate the fire extinguisher 100. The trigger 109 is also at least partially ornamental in nature and features nonfunctional elements, and can include a curved profile with rounded edges. As depicted, the trigger 109 is configured to be operated by a hand of an operator. Specifically, the operator may operate the trigger 109 while grasping the housing 108.

The safety pin 110 is configured to prevent accidental or premature dispensing of the fire extinguishing agent from the fire extinguisher 100. In the depicted embodiment, the safety pin 110 passes through both halves 114a, 114b of the housing 108. In some embodiments, the safety pin 110 also passes through the trigger 109. The safety pin 110 prevents the rotation of the trigger 109 when installed within the housing 108. In other embodiments, other safety devices are used with the fire extinguisher 100. For example, a removable tab can be used to prevent rotation of the trigger 109.

The tamper seal 112 shown is configured to be a redundant safety measure to prevent accidental discharge of the fire extinguisher 100. The tamper seal 112 is configured to be installed through the safety pin 110 and around the housing 108 to help retain the safety pin 110 within the housing 108. Such placement of the tamper seal 112 can help to retain the pin within the housing 108 during shipment of the fire extinguisher 100. In some embodiments, the tamper seal 112 serves to warn the user if the fire extinguisher 100 has been previously operated. In some embodiments, the tamper seal 112 is a tear-away seal configured to be removed by hand.

The cap 106 is shown disposed over at least a portion of the dispenser 104. The cap 106 is configured to be automatically removable from the fire extinguisher 100 prior to, or at the same time, that the fire extinguisher 100 dispenses the fire-extinguishing agent. The cap 106 is also shown to protect at least portion of the dispenser 104, specifically the portion where the fire-extinguishing agent is dispensed therefrom. In some embodiments, the cap 106 is at least partially ornamental in nature and features nonfunctional elements. In some embodiments, the cap 106 includes imprinted ornamental features. In other embodiments, the cap 106 includes a curved outer profile. The cap 106 will be discussed in more detail with respect to FIG. 4.

FIG. 2 shows a side view of a portion of fire extinguisher 100 with a half 114a removed from the housing 108 of the dispenser 104. As shown, the dispenser 104 is shown secured to the container 102 at a valve port 117 by way of a collet 118. Additionally, the dispenser 104 is shown to include an actuator 120 and the trigger 109 positioned within the housing 108. Further, a safety pin aperture 121 is shown in the housing half 114b. The safety pin aperture 121 is configured to receive the safety pin 110.

The valve port 117 provides access to the chamber for the dispensing of the fire extinguishing agent contained within the chamber. In some embodiments, the valve port 117 is configured to receive a valve. As shown, the valve port 117 can include a valve port lip 119. The valve port lip 119 helps add stability to the valve port 117 in addition to creating a mounting surface for the dispenser 104, specifically the collet 118.

The collet 118 is configured to be fixed to the container 102 and operate as an intermediate connection connecting the dispenser 104 and the container 102. In this example, the collet 118 has an aperture 122 passing through its center so that the actuator 120 can be inserted through the aperture 122 and connect to a valve (not shown) positioned within the valve port 117. The collet 118 can preferably be made of plastic to minimize possible leakage of an agent from the container 102.

The actuator 120 operates to release a fire-extinguishing agent that has been contained in container 102 in a pressurized state and discharge the agent through the conduit formed within the actuator 120. In this example, the actuator 120 is installed to the container 102 and is selectively in fluid communication with a chamber of the container 102, in which a fire-extinguishing agent is stored in a pressurized state. In some embodiments, the actuator 120 includes an inlet pipe 124, a discharging pipe 126, and a receptive portion 128. The inlet pipe 124 and the discharging pipe 126 are connected to be in fluid communication. In this example, the discharging pipe 126 is connected to the inlet pipe 124 substantially at a right angle. The inlet pipe 124 of the actuator 120 is mounted through the collet 118 and to a valve that is mounted within the valve port 117 of container 102. The actuator 120 can be retractably pressed toward the container 102. When the actuator 120 is pressed down toward the container 102, the inlet pipe 124 of the actuator 120 becomes in fluid communication with the chamber of the container 102 so that the agent stored in the chamber in a pressurized state can be discharged through the inlet pipe 124. Specifically, the inlet pipe 124 of the actuator 120 is connected to the container 102 but is not in fluid communication with the chamber when the fire extinguisher 100 is not in operation. In contrast, when the receptive portion 128 of the actuator 120 is pressed downward over a threshold pressure, the inlet pipe 124 of the actuator 120 is connected to the chamber of the container 102, thereby allowing the pressurized agent stored in the chamber to move from the chamber to the inlet pipe 124 and then dispense from the discharging pipe 126.

The trigger 109 is configured to be operated so that the actuator 120 becomes in fluid communication with the chamber of container 102 to discharge the agent contained in the container 102. In one embodiment, the trigger 109 includes a pivot portion 130, an actuation portion 132, and a lever portion 134.

The pivot portion 130 of the trigger 109 is configured to be engaged with the housing 108 and permit the trigger 109 to pivot about the pivot portion 130. The pivot portion 130 is provided generally in the middle of the trigger 109. In this example, the pivot portion 130 includes a pair of opposing projections. The opposing projections of the pivot portion 130 are engaged with the halves 114a, 114b of the housing 108.

The actuation portion 132 of the trigger 109 is configured and arranged adjacent to the receptive portion 128 of the actuator 120 so that the actuation portion 132 presses down the actuator 120 on the receptive portion 128 when the trigger 109 is rotated in a counterclockwise direction about the pivot portion 130.

The lever portion 134 is at the opposite end of the trigger 109 than the actuation portion 132. The lever portion 134 is configured to receive a pulling force by the user of the fire extinguisher 100. When the safety pin 110 is removed from safety pin aperture 121 in the dispenser 104, a pulling force exerted on the lever portion 134 will rotate the trigger 109 and cause the actuation portion 132 to press downward on the actuator 120, dispensing fire-extinguishing agent therefrom.

Figure 3:
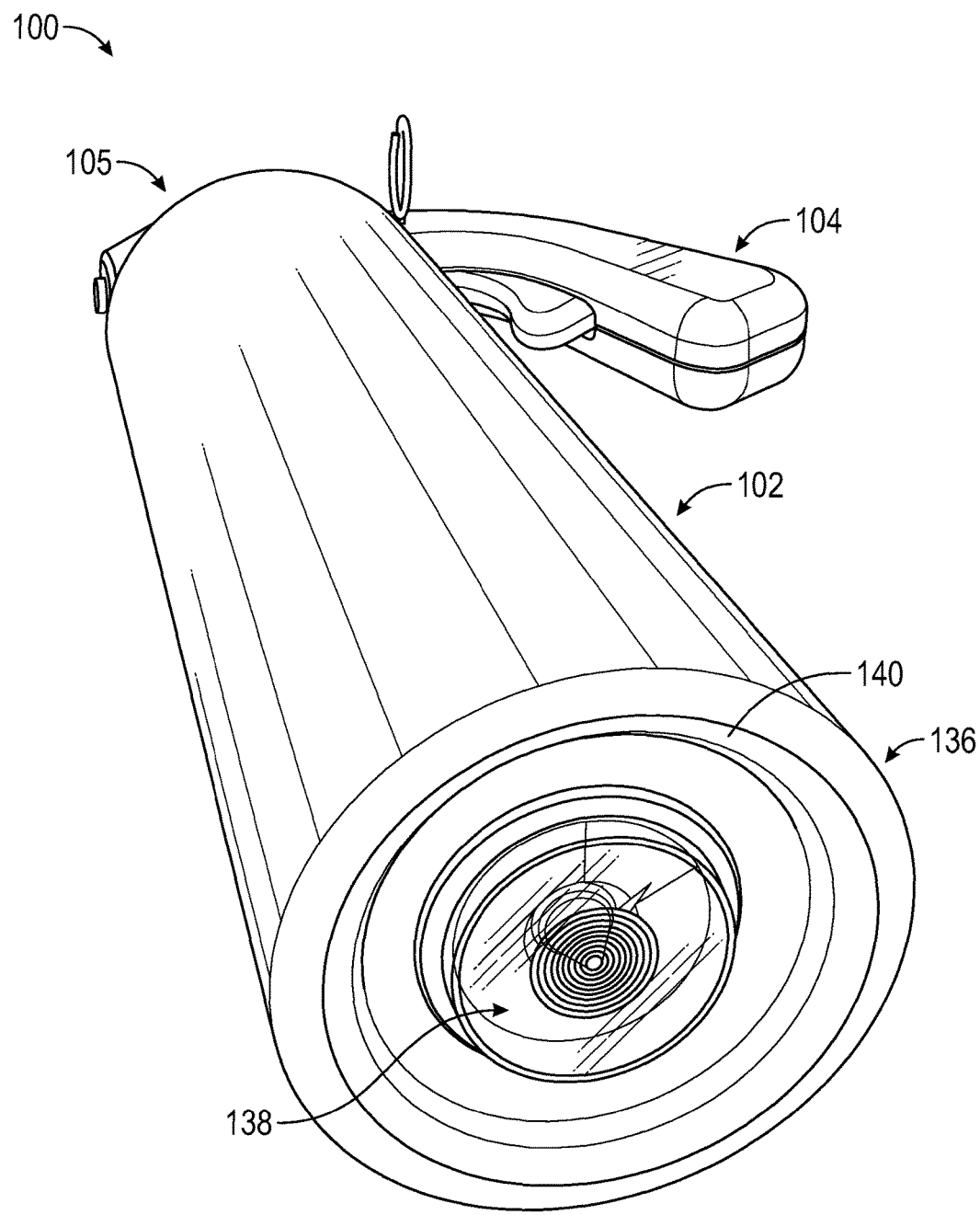
FIG. 3 illustrates a perspective view bottom view of the fire extinguisher of FIG. 1.

FIG. 3 shows the fire extinguisher 100 having a recessed bottom portion 136. The recessed bottom portion 136 is at the opposite end of the container 102 from the dispenser 104 and the domed upper portion 105 and configured to house a gauge 138. In the depicted embodiment, the gauge 138 is shown seated within the recessed bottom portion 136 so that the fire extinguisher 100 may sit on a flat surface.

In the depicted embodiment, the recessed bottom portion 136 is integral in the container 102. In some embodiments, the recessed bottom portion 136 is manufactured separately and attached to the container 102. Additionally, the recessed bottom portion 136 has an edge 140 for supporting the fire extinguisher 100 in an upright manner.

The gauge 138 is configured to display a characteristic of the chamber of the container 102. In some embodiments, the gauge 138 displays a pressure reading of the chamber. In other embodiments, the gauge 138 displays a temperature reading of the chamber. In still other embodiments, the gauge 138 displays a temperature and pressure reading of the chamber. In some embodiments, the gauge 138 measures the amount of fire-extinguishing agent remaining within the fire extinguisher 100.

Figure 4:
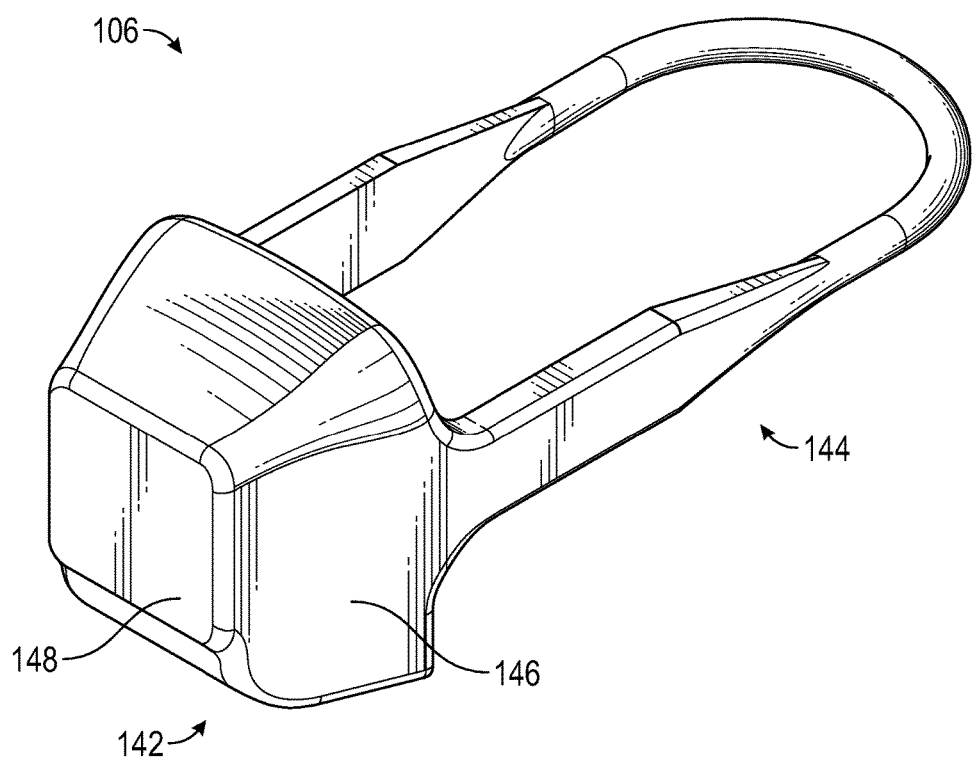
FIG. 4 illustrates a perspective view of a cap for a fire extinguisher, according to one embodiment of the present disclosure.

FIG. 4 shows a front perspective view of the cap 106. As shown, the cap 106 includes a main body portion 142 and a securing portion 144. The cap 106 is configured to prevent damage to the dispenser 104 during storage and transit. In addition, the cap 106 prevents debris from clogging the dispenser 104, specifically the discharging pipe 126 of the actuator 120. In some embodiments, the cap 106 includes only the main body portion 142. In the depicted embodiment, the cap 106 is reusable.

The main body portion 142 is shown to have a generally hollow hemispherical shape. However, the main body portion 142 can have a variety of different shapes. For example, the main body portion 142 can be a plug that is configured to be inserted into the discharging pipe 126 of the actuator 120. In other embodiments, the main body portion 142 is a flat piece of material configured to cover the discharging pipe 126 of the actuator 120. In the depicted embodiment, the main body portion 142 portion includes generally flat side walls 146 and a tip 148 that partially surround a portion of the dispenser 104. The tip 148 is configured to fit at least around the discharging pipe 126 of the actuator 120 of the dispenser 104. In some embodiments, the main body portion 142 is configured to conform to the shape of the dispenser 104 to which it is attached. In some embodiments, the tip 148 and side walls 146 also serve to provide impact protection for the dispenser 104. In some embodiments, the main body portion 142 is constructed of an impact resilient material. In some embodiments, the main body portion 142 is constructed of an elastomer. In other embodiments, the main body portion 142 is an injection molded plastic. In still other embodiments, the main body portion 142 has a hard outer shell and an elastomer inner shell that is configured to make contact with the dispenser 104 (not shown).

The securing portion 144 is configured to secure the cap 106 to the dispenser 104. Such securing is described in detail with respect to FIGS. 8-10. In some embodiments, the securing portion 144 is attached to the main body portion 142. In other embodiments, the securing portion 144 and the main body portion 142 are manufactured as a single part. In the depicted embodiment, the securing portion 144 is a strap. In some embodiments, the securing portion 144 is configured to the stretch around a portion of the dispenser 104. In other embodiments, the securing portion 144 is configured to break away from the dispenser 104 prior to using the fire extinguisher 100. Like the main body portion 142, the securing portion 144 can be manufactured from a variety of materials. In some embodiments, the securing portion 144 is manufactured from an elastomer. In other embodiments, the securing portion 144 is manufactured from a plastic.

Figure 5:
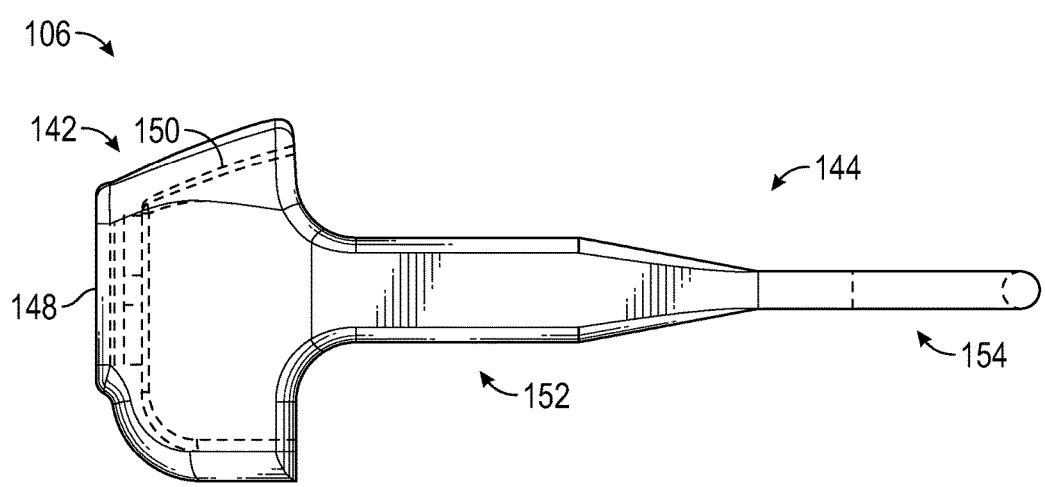
FIG. 5 illustrates a side view of the cap for a fire extinguisher of FIG. 4.
Figure 6:
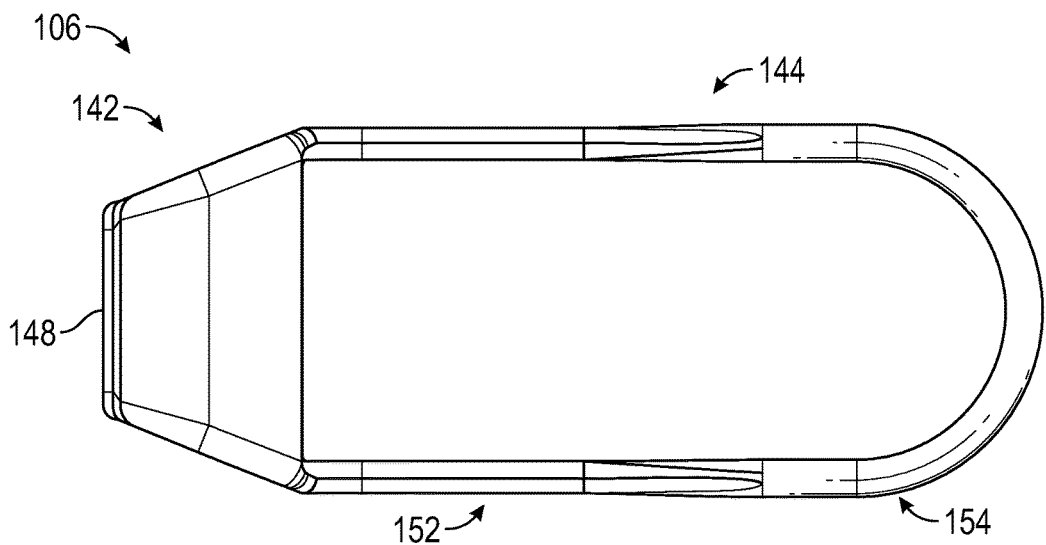
FIG. 6 illustrates a top view of the cap for a fire extinguisher of FIG. 4.

FIG. 5 shows a side view of the cap 106, and FIG. 6 shows a top view of the cap 106. The securing portion 144 and the main body portion 142 are shown as integral portions of the cap 106. The main body portion 142 is shown to include an interior profile 150. The interior profile 150 of the generally hollow hemispherical main body portion 142 is configured to substantially match a profile of the dispenser 104. Specifically, the interior profile 150 is configured to match the dispenser profile of the portion of the housing 108 nearest the discharging pipe 126 of the actuator 120.

The securing portion 144 is also shown to include a tab portion 152 and a rounded portion 154. The tab portion 152 is shown to have a larger cross-section than the rounded portion 154. However, in some embodiments, the securing portion 144 has a consistent cross-section. In some embodiments, when the securing portion 144 is manufactured from an elastomer, the rounded portion 154 is configured to stretch a greater distance when compared to the tab portion 152 when installed on the dispenser 104, due to the smaller cross-sectional area of the rounded portion 154. In some embodiments, the tab portion 152 has a generally rectangular cross-section, and the rounded portion 154 has a generally circular cross-section.

Figure 7:
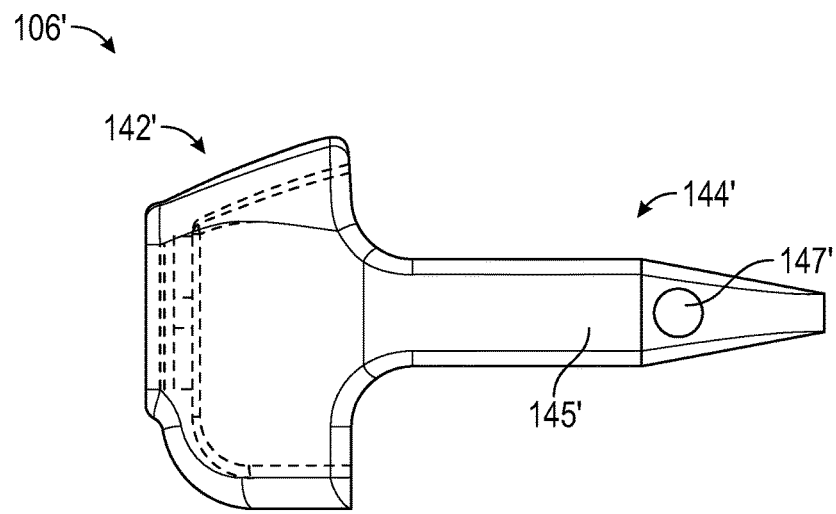
FIG. 7 illustrates a side view of a cap for a fire extinguisher, according to one embodiment of the present disclosure.

FIG. 7 shows an alternative embodiment of a cap 106'. Similar to the cap 106 described above, the cap 106' includes a main body portion 142' and a securing portion 144'. The main body portion 142' is substantially similar to the main body portion 142. However, the securing portion 144' is shown to include at least one tail 145' for securing the cap 106' to the dispenser 104. In some embodiments, the cap 106' can include a pair of tails 145'. In the depicted embodiment, the tails 145' are manufactured from an elastomer. For securing to the dispenser 104, the tail 145' includes a safety pin securing aperture 147'. When installed on the dispenser 104, the main body portion 142' is positioned around the dispenser 104, specifically at least around the discharging pipe 126 of the actuator 120, and the tails 145' are positioned at the side of the dispenser 104. Additionally, the safety pin 110 is configured to pass through the safety pin securing apertures 147' when inserted into the housing 108 of the dispenser 104. In some embodiments, the tails 145' may be at least partly under tension when the safety pin 110 is positioned within the safety pin securing apertures 147'. Due to such tension and the elastic properties of the tails 145', when the safety pin 110 is removed, the cap 106' is propelled from the dispenser 104. Thereby, as the cap 106' is propelled from the dispenser 104, it is automatically removed so that the fire extinguisher 100 is ready to operate.

Figure 8:
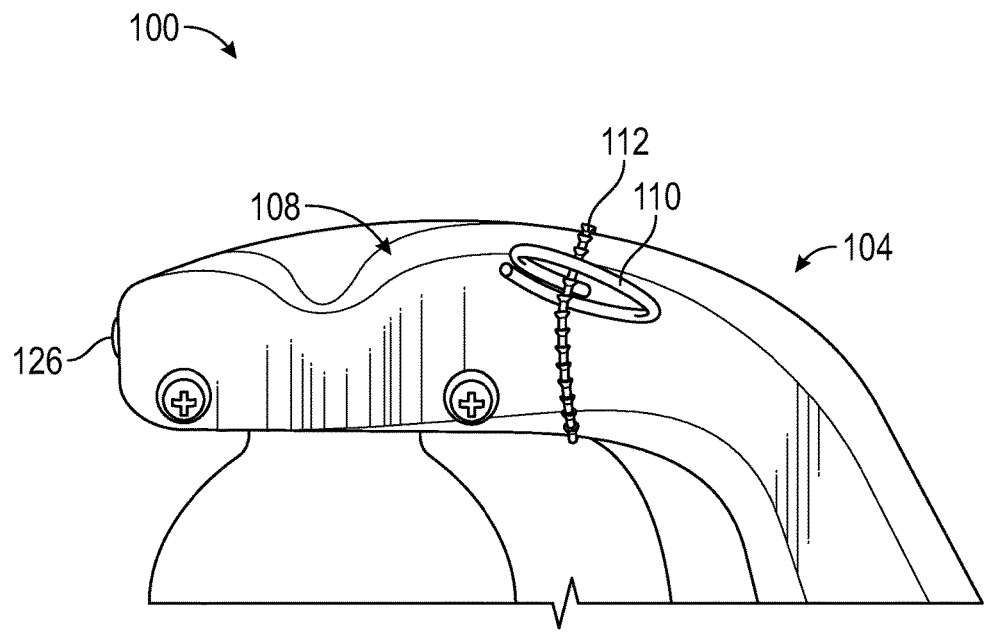
FIG. 8 illustrates an installation process of installing a cap to a fire extinguisher.
Figure 9:
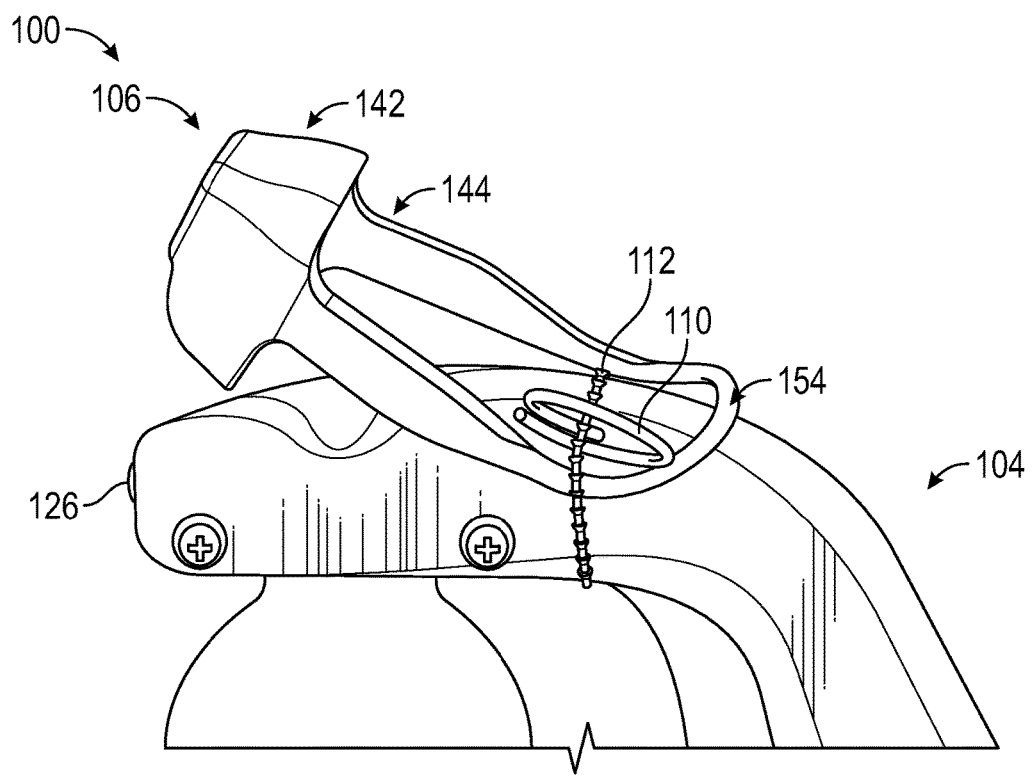
FIG. 9 further illustrates the installation process of FIG. 8.
Figure 10:
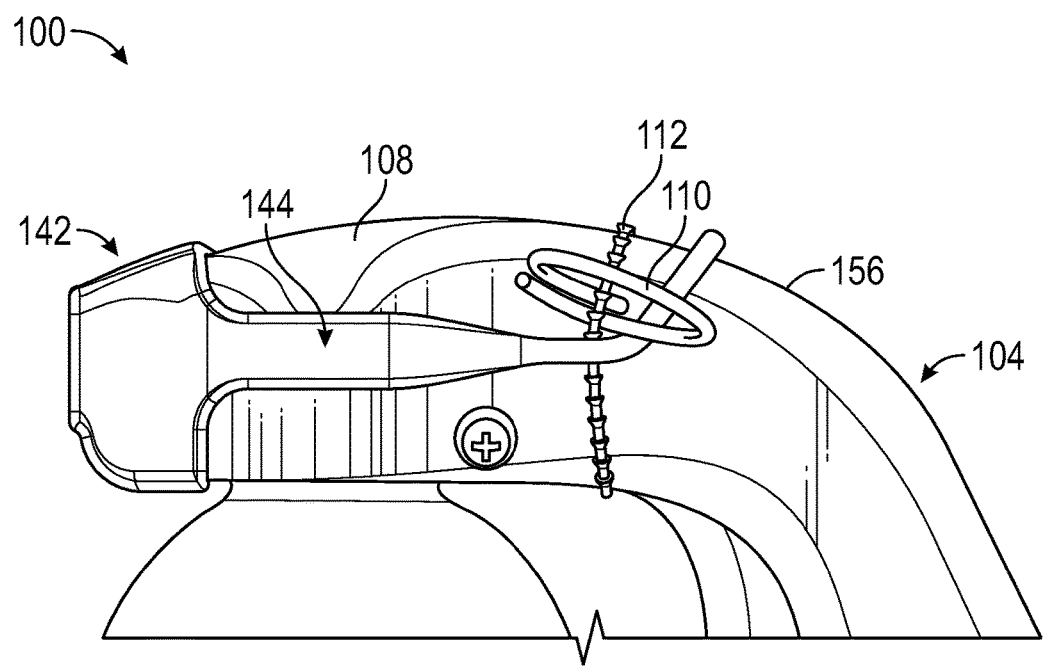
FIG. 10 further illustrates the installation process of FIG. 8.

FIGS. 8-10 show an installation process of installing the cap 106 onto the dispenser 104 of the fire extinguisher 100. As mentioned above, the cap 106 can be reused and is configured to be installed on a fire extinguisher 100 that includes a safety device, like the safety pin 110.

FIG. 8 shows the fire extinguisher 100 without the cap 106 installed. The fire extinguisher 100 is shown with the safety pin 110 installed, as well as the tamper seal 112. In some embodiments, the tamper seal 112 can be removed prior to installing the cap 106. Also, the discharging pipe 126 of the actuator 120 is shown partially extending from the housing 108 of the dispenser 104.

FIG. 9 shows the cap 106 in the middle of the installation process. As shown, the cap 106, specifically the rounded portion 154 of the securing portion 144, is shown partially wrapped around the underside of one side of the safety pin 110. To complete installation, the rounded portion 154 is also wrapped around the underside of the opposite end of the safety pin 110. Next, the main body portion 142 is positioned around the dispenser 104, specifically the discharging pipe 126 of the actuator 120. In some embodiments, when positioning the main body portion 142 around the dispenser 104, the securing portion 144 is stretched and put under tension.

FIG. 10 shows the cap 106 installed to the dispenser 104, similar to the view shown in FIG. 1. As shown, the securing portion 144 is under tension, exerting a force upon the safety pin 110 in a direction toward the main body portion 142 and a force on the main body portion 142 in a direction toward the securing portion 144. In the depicted embodiment, the force exerted on the safety pin 110 by the rounded portion 154 of the securing portion 144 is greater than the force exerted on the housing 108 by the main body portion 142. This is due to the tendency of the rounded portion 154 to stretch a greater distance due to its relatively small cross-section area (as mentioned with respect to FIG. 5). Due to the rounded portion 154 stretching a greater distance, the elastic force is greater at the rounded portion 154 of the securing portion 144, and therefore, the force exerted on the safety pin 110 is greater than the force exerted on the housing 108. Such tension in the cap 106 secures the main body portion 142 firmly against the dispenser 104 and the securing portion 144 firmly against the safety pin 110, so as to prevent accidental removal of the cap 106. Additionally, as shown, the rounded portion 154 is positioned at a top surface 156 of the housing 108 of the dispenser 104.

Figure 11:
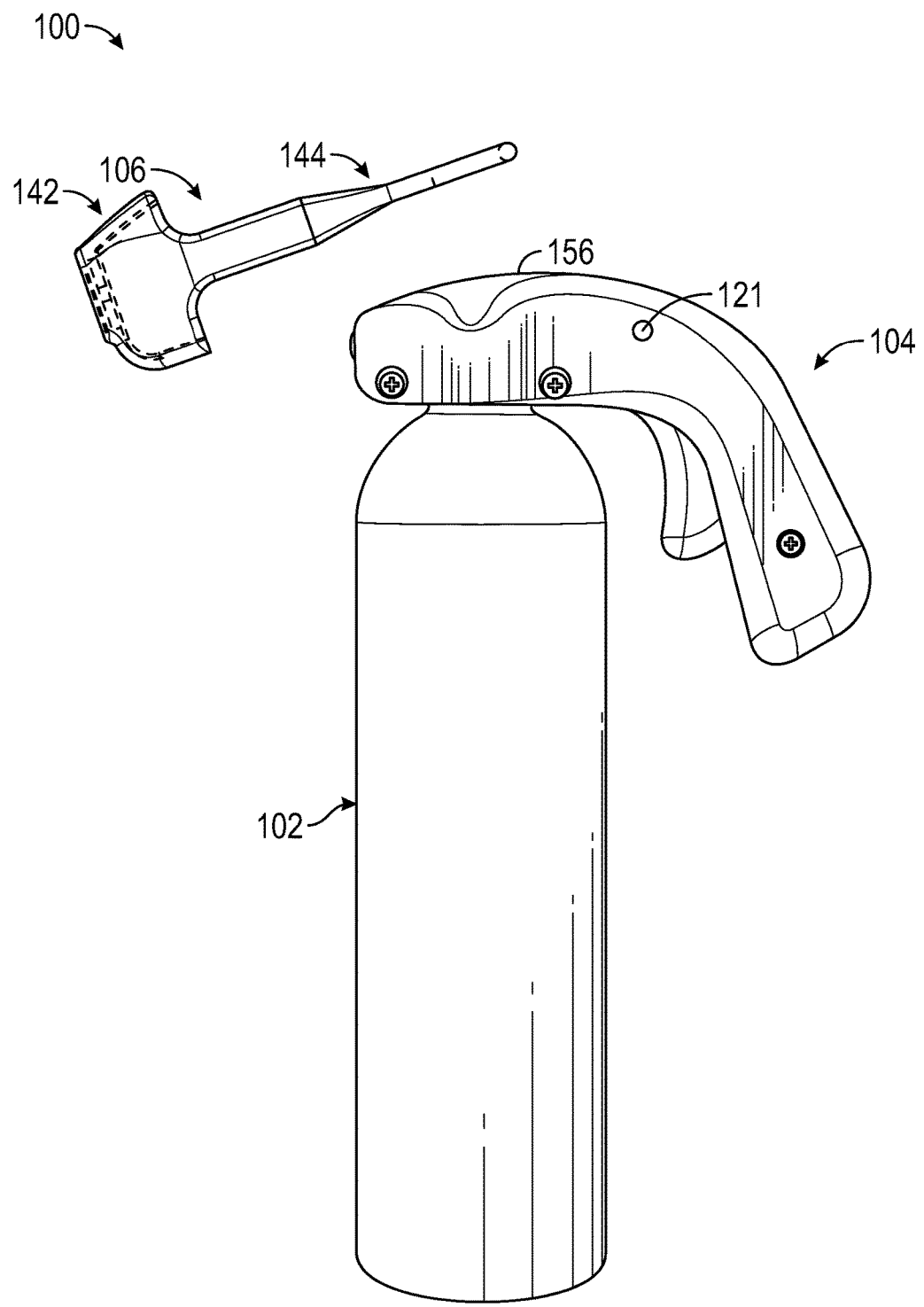
FIG. 11 illustrates the removal of a cap from a fire extinguisher.

FIG. 11 shows the fire extinguisher 100 as the cap 106 and the safety pin 110 are removed. During operation of the fire extinguisher 100, it is imperative that the user be able to quickly operate the fire extinguisher 100 in the event of a fire. To do so, the user first removes the safety pin 110 (not shown in FIG. 11). In some embodiments, the tamper seal 112 is removed prior to removing the safety pin 110. Once the safety pin 110 is removed, the cap 106 is automatically removed. Such automatic removal can occur in two different ways.

First, automatic removal of the cap 106 is achieved when removing of the safety pin 110 from the safety pin aperture 121 of the dispenser 104. As mention above, when installed to the dispenser 104, the cap 106 is under tension. However, due to the greater force applied to the safety pin 110 than to the housing 108 by the main body portion 142, once the safety pin 110 is removed from the housing 108, a rubber-band like effect is created, and the cap 106 is propelled from the dispenser 104 as the securing portion 144 retracts due to the elasticity of the securing portion 144. Further aiding in the removal of the cap 106, the rounded portion 154 of the securing portion 144 is configured to slide, or roll, on the top surface 156 of the dispenser 104.

Second, automatic removal of the cap 106 from the dispenser 104 can also be achieved by dispensing a fire-extinguishing agent from discharging pipe 126 of the dispenser 104 after the safety pin 110 is removed from the dispenser 104. Such removal is possible due to the force exerted by the fire-extinguishing agent on the interior profile 150 of the main body portion 142 of the cap 106, which is installed over the discharging pipe 126. Such removal is useful when using a cap 106 that is not under tension, or a cap 106 that is configured to only include a main body portion 142.

Figure 12:
FIG. 12 illustrates a schematic view of a fire extinguisher with a cap, according to one embodiment of the present disclosure.

FIG. 12 shows a schematic example of a cap 206 installed to a traditional fire extinguisher 200. Similar to the cap 106 described above, the cap 206 is configured to be positioned around at least a portion of a dispenser 204 of the fire extinguisher 200. Specifically, as shown, the cap 206 is installed so as to cover a nozzle 208 of the dispenser 204 of the fire extinguisher 200. In some embodiments, the cap 206 is installed to an end of a hose (not shown) that is attached to the nozzle 208.

The cap 206 is automatically removable, like the cap 106. As shown, portions of the cap 206 are positioned under a safety pin 210, and on top of a dispenser handle 212. Upon removal of the safety pin 210, the cap 206 is configured to be automatically removed from the fire extinguisher 200 by the elastic force of the cap 206 or the force of the fire-extinguishing agent being expelled from the fire extinguisher 200 against the cap 206.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A dispenser cap for a fire extinguisher, the fire extinguisher including a dispenser with a dispensing pipe for dispensing a fire extinguishing agent from the fire extinguisher, the dispenser cap comprising:
    a main body portion having a recessed region configured to cover the dispensing pipe of the fire extinguisher; and
    a securing portion adjacent to the main body portion, the securing portion being configured to be removably attached to the dispenser of the fire extinguisher, the securing portion comprising a strap having first and second ends, the first and second ends of the strap being connected to the main body portion, the strap being configured to loop around the dispenser to secure the main body portion to the dispenser.

2. The dispenser cap of claim 1, wherein the strap includes a portion with a generally circular cross-section.

3. The dispenser cap of claim 2, wherein the portion with the generally circular cross-section is positioned at an opposite end of the dispenser cap than the main body portion.

4. The dispenser cap of claim 1, wherein the securing portion is a pair of flaps.

5. The dispenser cap of claim 4, wherein the flaps each include a securing aperture.

6. The dispenser cap of claim 5, wherein the securing apertures are configured to receive a safety pin of the fire extinguisher.

7. The dispenser cap of claim 1, wherein the at least the securing portion is comprised of an elastomer.

8. The dispenser cap of claim 1, wherein the main body portion and the securing portion are comprised of an elastomer.

9. A dispenser cap for a fire extinguisher comprising:
    a main body portion having a generally hemispherical shape; and
    a securing portion adjacent to the main body portion, the securing portion being configured to be removably attached to a dispenser of the fire extinguisher, wherein the securing portion comprises a pair of flaps, the flaps each including a securing aperture.

10. The dispenser cap of claim 9, wherein the securing apertures are configured to receive a safety pin of the fire extinguisher.

11. A dispenser cap for a sprayer, the sprayer including a dispenser with a dispensing pipe for spraying a fire extinguishing or repellant agent from the sprayer, the dispenser cap comprising:
    a main body portion having a recessed region configured to cover a dispensing pipe of the sprayer; and
    a securing portion adjacent to the main body portion, the securing portion being configured to be removably attached to a dispenser of the sprayer, the securing portion comprising a strap having first and second ends, the first and second ends of the strap being connected to the main body portion, the strap being configured to loop around the dispenser to secure the main body portion to the dispenser.

12. The dispenser cap of claim 11, wherein the strap includes a portion with a generally circular cross-section.

13. The dispenser cap of claim 12, wherein the portion with the generally circular cross-section is positioned at an opposite end of the dispenser cap than the main body portion.

14. The dispenser cap of claim 11, wherein the securing portion is a pair of flaps.

15. The dispenser cap of claim 14, wherein the flaps each include a securing aperture.

16. The dispenser cap of claim 15, wherein the securing apertures are configured to receive a safety pin of the fire extinguisher.

17. The dispenser cap of claim 11, wherein the at least the securing portion is comprised of an elastomer.

18. The dispenser cap of claim 11, wherein the main body portion and the securing portion are comprised of an elastomer.

* * * * *